(No Model.) 2 Sheets—Sheet 1.
G. A. BROWN & B. HOLT.
MACHINE FOR SANDPAPERING WHEEL RIMS OR FELLIES AND OTHER ARTICLES.
No. 258,553. Patented May 30, 1882.
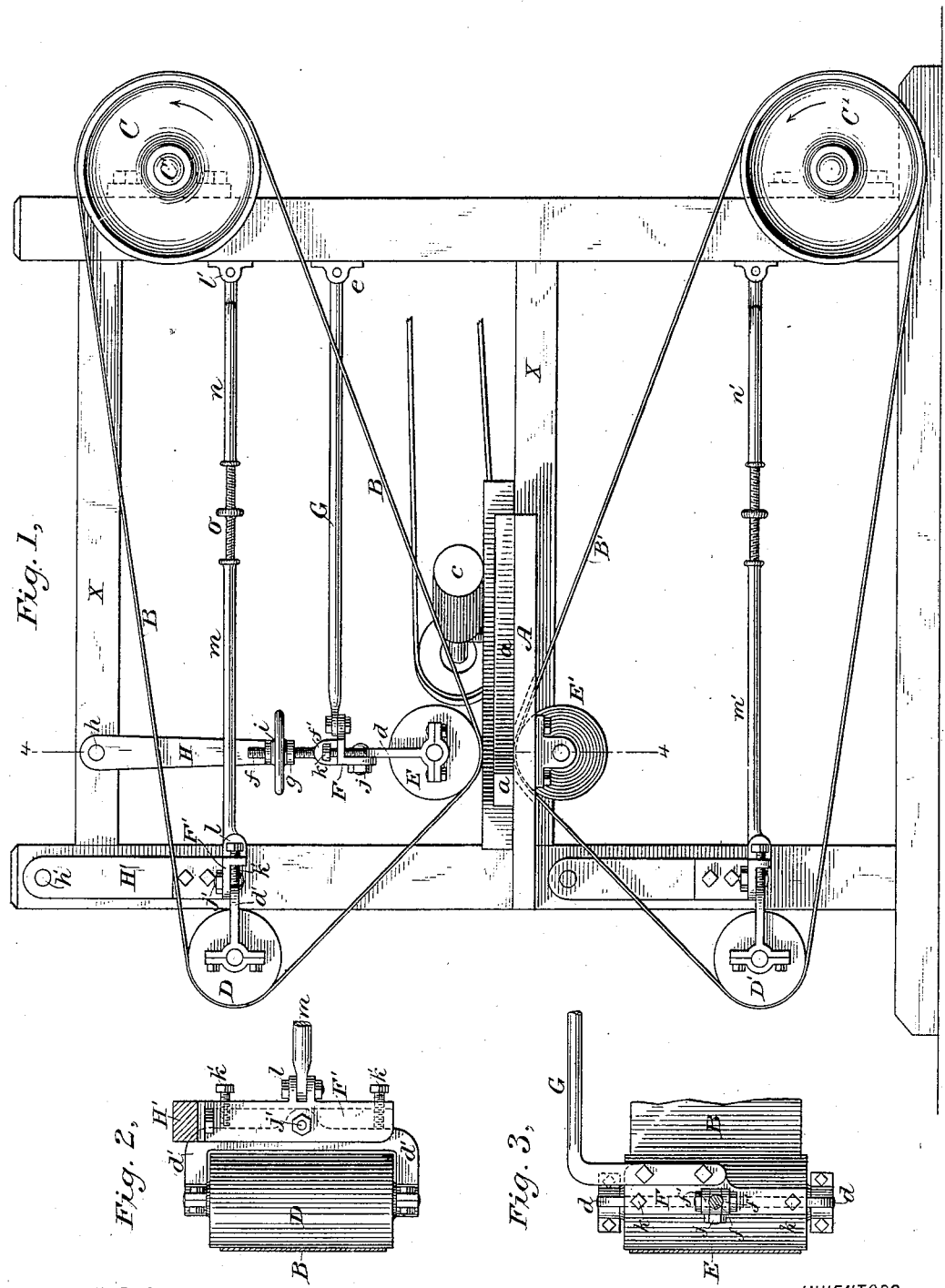
WITNESSES
Wm A. Skinkle
Geo. W. Breck
INVENTORS
George A. Brown.
Benjamin Holt.
By their Attorney (No Model.) 2 Sheets—Sheet 2.
G. A. BROWN & B. HOLT.
MACHINE FOR SANDPAPERING WHEEL RIMS OR FELLIES AND OTHER ARTICLES.
No. 258,553. Patented May 30, 1882.
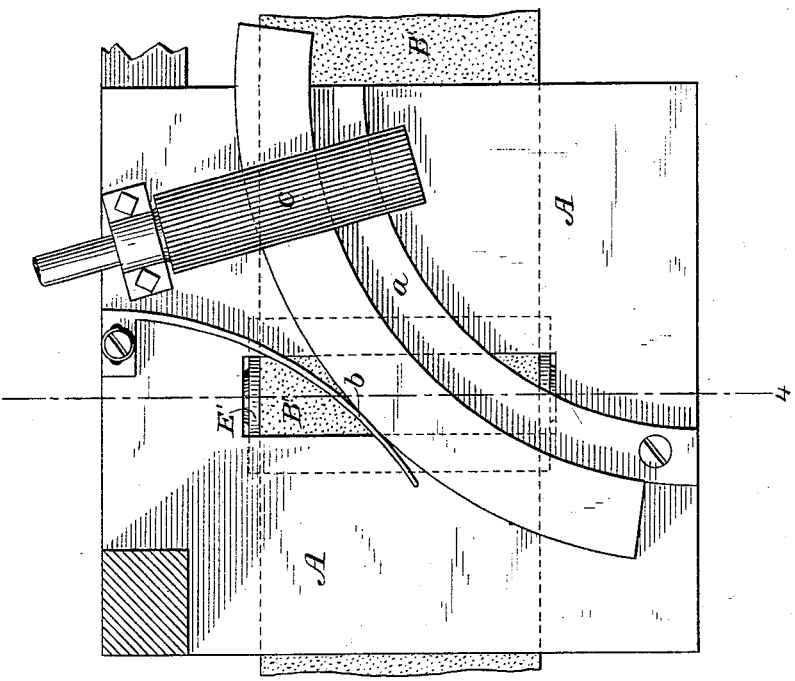
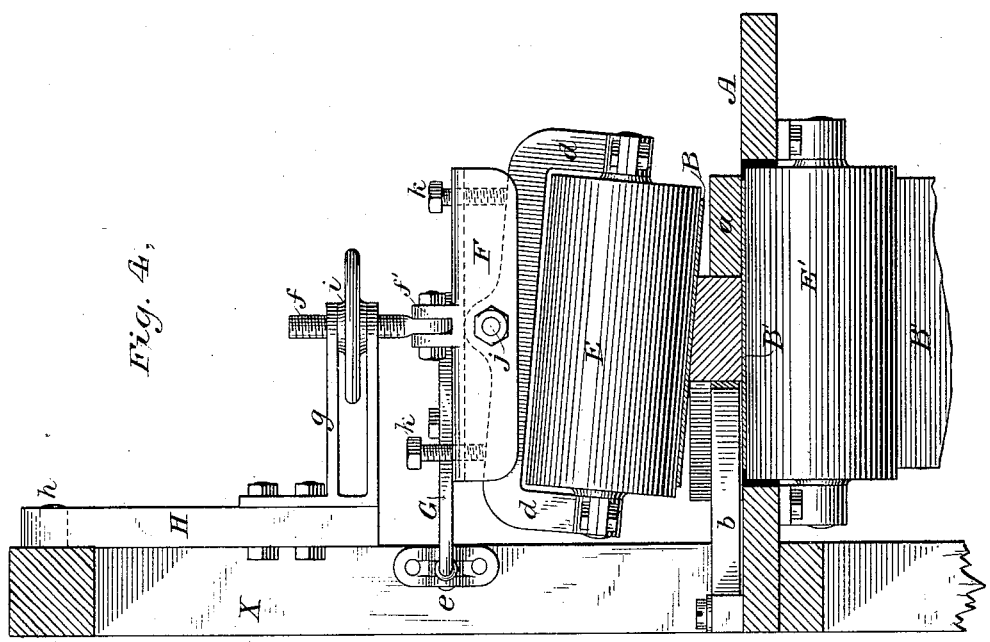
WITNESSES
Wm A. Skinkle
Geo W. Breck
INVENTORS
George A. Brown.
Benjamin Holt,
By their Attorney
Marcellus Bailey

UNITED STATES PATENT OFFICE.

GEORGE A. BROWN AND BENJAMIN HOLT, OF CONCORD, NEW HAMPSHIRE, ASSIGNORS OF ONE-THIRD TO AMES F. HOLT, OF SAME PLACE.

MACHINE FOR SANDPAPERING WHEEL RIMS OR FELLIES AND OTHER ARTICLES.

SPECIFICATION forming part of Letters Patent No. 258,553, dated May 30, 1882.

Application filed January 17, 1882. (No model.)

*To all whom it may concern:*

Be it known that we, GEORGE A. BROWN and BENJAMIN HOLT, of Concord, in the State of New Hampshire, have invented certain new and useful Improvements in Machines for Sandpapering Wheel Rims or Fellies and other Articles of Wood, of which the following is a specification.

Our invention is directed to machinery designed primarily to sandpaper the rims or fellies of wheels—an operation which hitherto, so far as we are aware, has been performed by hand, and has been both slow and expensive. The machinery, however, is adapted, with slight changes in detail, to operate upon other wooden articles. We employ, in connection with a suitable guide-bed and feed mechanism, by which the rim, felly, or other piece to be operated on is supported, guided, and fed along, an endless traveling belt coated with sand or other equivalent material, which belt is caused to act on the wood through the instrumentality of a roller, (preferably yielding or elastic to a slight extent,) which is both vertically adjustable—that is to say, movable to and from the article to be operated on—and capable of being canted or tilted in the direction of its length, so as to be set at any angle required by the bevel or slant of the face of the wood to be acted on. The belt is carried by this roller in connection with pulleys, and provision is of course made for keeping the belt taut, whatever may be the position of the roller first above referred to, which may be termed the "pressure" or "acting" roller. We in practice use two belts, with pressure-rollers and carrying-pulleys to operate simultaneously on both sides of the wood, and we prefer in some cases—where, for instance, both the upper and under faces of the wood are beveled—to make the pressure or acting rollers of both belts capable of the several adjustments hereinbefore mentioned. In other cases, however, it may not be necessary to make the roller of the under belt thus adjustable. Our improvements, however, can best be explained and understood by reference to the accompanying drawings, which represent a machine embodying the several features of our invention in one practicable form.

Figure 1 is a side elevation of the machine. Fig. 2 is a plan, on enlarged scale, of the adjustable belt-carrying pulley or roll D, hereinafter referred to, and its adjuncts. Fig. 3 is a like view of the pressure-roller. Fig. 4 is an end sectional elevation of part of the machine on enlarged scale. Fig. 5 is a plan of the table with the feed mechanism and guides.

In the machine shown in the drawings two endless belts are employed, one above and one below the bed or table A. The upper belt, B, passes and is stretched around and carried by pulleys C D and the pressure or acting roller E. The pulley C is mounted on power-driven shaft C', which causes the belt to travel continuously in the direction indicated by the arrow. The belt is preferably made of a strip of canvas, coated with glue or other suitable adhesive substance, which while still moist is sprinkled thoroughly with sand or equivalent material. The machine is adapted in this instance to sandpaper the curved rims or fellies of wheels, and for this purpose is provided with a curved guide, $a$, and a spring, $b$, which holds against the guide the curved face of the rim that passes along between it and the guide, this movement of the rim being caused by the power-driven feed wheel or roller $c$, beneath which the rim passes. It is desirable that the belt should act on the rim (or other strip of wood) at an angle, and for this purpose the feed-roll and the guide are set quartering to the pressure-roller E, as shown. The roller E is so arranged and supported that it can be moved up and down, so as to be set for rims of different thicknesses. The means which we prefer for the purpose of obtaining this adjustment are shown in the drawings. The roller has axles which are mounted and revolve in boxes formed in a yoke, $d$, carried by a bracket, F, which is securely fastened to a beam, G, (usually about four feet long.) This beam is hinged to or hinged on a horizontal axle in the frame X of the machine at $e$. To the bracket F is jointed, at $f'$, an adjusting-screw, $f$, which passes up loosely through a forked guide-iron, $g$, bolted to a swinging arm, H, pivoted to the main frame at $h$. Between the forks of the guide-iron $g$ is held the nut $i$, by turning which the screw, and consequently the roller-carrying bracket, is raised or lowered, as desired. The joints $e f' h$ permit this up-and-down adjustment to be made with facility, and the arrangement is cheap, simple, strong, and entirely effective.

As hereinbefore said, it is necessary that the roller E should also be arranged in such manner that it may be canted or tilted in the direction of its length. When dressing down, for instance, a rim with a beveled upper face, such as shown in Fig. 4, it is necessary to cant or tilt the roller to a corresponding angle, so that it may hold the belt in contact with the face of the wood throughout its width. To this end we provide the yoke $d$ above referred to. This yoke is pivoted centrally to the bracket F at $j$, and through the top horizontal flange of the bracket-screw set-screws $k$ are arranged, one to each side of the pivot $j$, with their lower ends bearing upon the top of the yoke. By adjusting these screws the yoke can be tilted or canted in either direction, and can be held most firmly in any desired position. This is one means of effecting the specified adjustment. Other means will readily suggest themselves.

It is necessary that one of the carrying-pulleys should be adjustable in order to keep the belt taut, and to compensate for any variations in the position of the pressure-roller. The pulley or roll D is adjustable in the present instance. Like the roller E, it is mounted in a yoke, $d'$, which is pivoted centrally to a bracket, F', at $j'$, and set-screws $k'$ in the bracket regulate the position of the yoke. The bracket F' is bolted fast to a swinging arm, H', pivoted to the main frame at $h'$, and to the bracket is jointed, at $l$, a two-part rod, $m\ n$, jointed at the other end to the frame X at $l'$, and having its two parts connected by a right and left screw-rod, $o$, by turning which in one direction or the other the working length of the rod can be increased or lessened at pleasure. By means of the rod, which pushes out or draws in, as desired, the pulley or roll D, the said belt can be kept taut, and by the tilting or canting of the yoke $d'$ the roll D can be caused to take up or compensate for uneven stretching of the belt at its edges, or for looseness in the belt, that might otherwise be occasioned on one side of the belt by the canting or tilting of the pressure-roller E.

The lower belt, B', and its accessories may be entirely similar in arrangement to the upper belt, B, and its adjuncts. It is carried and operated in the same way by rolls or pulleys C' D' and pressure or acting roller E'. The latter is shown as arranged without capacity for vertical adjustment or lengthwise tilting or canting, and is so placed that the belt which passes above it will protrude through the opening formed for it in the bed or table A, so as to be just about flush with the face of the same, protruding far enough only to act properly upon the under face of the rim passing along upon the bed. This arrangement is sufficient when the under face of the curved rim is square with its inner or concave edge, so as to be flat on the table, as shown in the drawings; but in some kinds of curved rims or fellies both faces or sides are beveled, and it becomes necessary in that event to cant or tilt the under pressure-roll. In such cases the pressure-roller E' can be arranged to have the same capacity for adjustment as the upper roller, E. The pulley or roll D' is mounted in the same way as the roll D, and is combined in like manner with a two-part rod, $m'\ n'$.

It is not necessary that the two pressure-rollers E E' should be directly opposite one another. The one may be a little in advance of the other without detriment.

We have stated in the opening portion of our specification that the pressure-roller should be arranged so as to yield slightly. We prefer for this purpose to cover it with vulcanized rubber or like elastic material, which will permit local yielding of its periphery at points where there may be protuberances or irregularities on the belt.

What we claim as of our invention is—

1. The combination, with the bed or table and a guide or guides and feed mechanism for the material to be operated on, of the sandpapering-belt, the carrying-pulleys, and the pressure-roller, adjustable to and from the table and adapted to be canted or tilted in the direction of its length, under the arrangement and for operation substantially as hereinbefore set forth.

2. The combination, with the bed or table and a guide or guides and feed mechanism for the material to be operated on, of the two sandpapering-belts, one above and the other below the table, the carrying-pulleys, and the pressure-rollers, one or both adjustable to and from the table and adapted to be canted or tilted in the direction of their length, substantially as and for the purposes hereinbefore set forth.

In testimony whereof we have hereunto set our hands this 24th day of December, 1881.

GEO. A. BROWN.
BENJ. HOLT.

Witnesses:
E. A. DICK,
P. B. DOING.